J. CARR.
TOOL.
APPLICATION FILED OCT. 30, 1909.
1,016,207.
Patented Jan. 30, 1912.
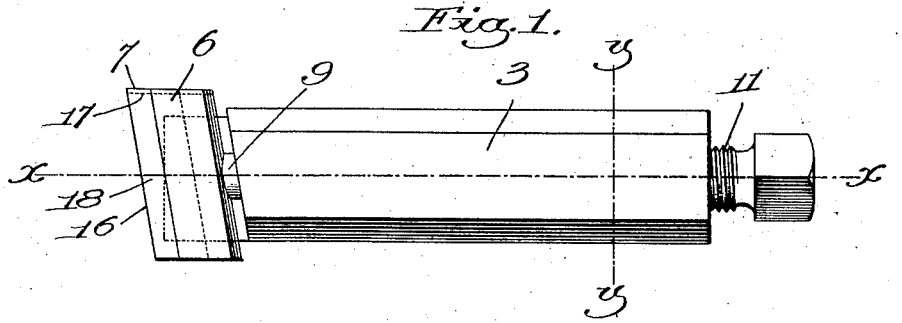
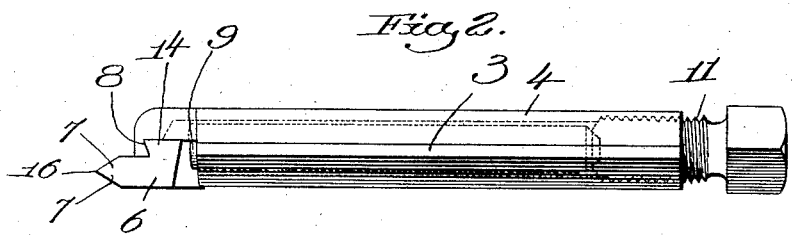
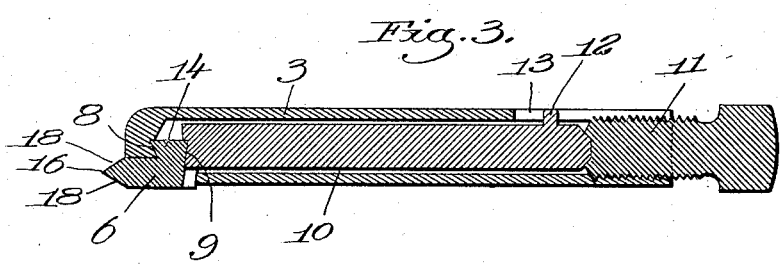
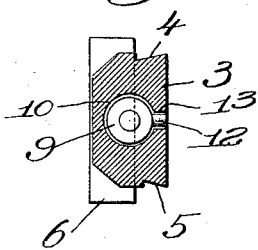
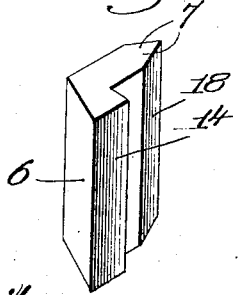
Witnesses:
Fred S. Greenleaf.
Joseph M. Ward.
Inventor,
James Carr,
by Crosby & Gregory
Attys.
COLUMBIA PLANOGRAPH CO., WASHINGTON, D. C.

UNITED STATES PATENT OFFICE.

JAMES CARR, OF NEW HAVEN, CONNECTICUT, ASSIGNOR, BY MESNE ASSIGNMENTS, TO THE HENRY G. THOMPSON & SON COMPANY, OF NEW HAVEN, CONNECTICUT, A CORPORATION OF CONNECTICUT.

TOOL.

1,016,207. Specification of Letters Patent. Patented Jan. 30, 1912.

Application filed October 30, 1909. Serial No. 525,547.

*To all whom it may concern:*

Be it known that I, JAMES CARR, a citizen of the United States, and resident of New Haven, county of New Haven, and State of Connecticut, have invented an Improvement in Tools, of which the following description, in connection with the accompanying drawing, is a specification, like characters on the drawing representing like parts.

This invention relates to tools adapted for turning, thread-cutting, planing, or any other metal work of a similar nature, and it has for its object to provide a novel tool of this character which is provided with a shank or body that is adapted to be clamped in the tool post or other tool-holding device and which is also provided with a removable or adjustable cutting member. The cutting member is so constructed that it will always present a cutting edge of the correct shape which will not be distorted by any grinding or sharpening of the cutting member. The cutting member is also made removable so that it can be taken out from the tool and ground without disturbing the position of the tool in the tool holder.

In the accompanying drawings I have shown one embodiment of my invention and I will now proceed to describe said embodiment and then will point out the novel features in the appended claim.

In the drawings Figure 1 is a side view of the tool embodying the invention; Fig. 2 is a top plan view; Fig. 3 is a section on the line *x—x*, Fig. 1; Fig. 4 is a section on the line *y—y*, Fig. 1; Fig. 5 is a perspective view of the cutting member removed.

The device comprises a shank or body 3 which is adapted to be held in a tool post or any other suitable tool-holding device of a lathe, planer, shaper, or any other metal-working machine. The particular form of shank herein shown is one which is especially designed to be held in the tool-holding device shown in Patent No. 939,976, dated November 16, 1909, and it is provided with the inclined surfaces 4 and 5 at the top and bottom which are adapted to be gripped between the tool-clamping members of said tool-holding device. The particular form of shank, however, does not form any part of the present invention, and said shank might be of the usual shape which is adapted to be held in an ordinary tool post.

At the end of the shank is a cutting member 6 which is removably carried by the shank. This cutting member may have a cutting edge of any desired shape depending upon the character of the work which is to be done. In the drawings I have shown a cutting member adapted for cutting threads, that is, one with the V-shaped cutting edge 7. This cutting member is clamped to the shank by being gripped between two clamping jaws 8 and 9. The jaw 8 is a fixed jaw rigid with the body 3, and the jaw 9 is a movable jaw adapted to move toward and from the fixed jaw. In the present embodiment of my invention the jaw 9 is in the form of a pin which occupies a bore 10 extending longitudinally of the body 3, said jaw deriving its clamping movement from a clamping screw 11 carried in the end of the body 3 and arranged to act against the end of the jaw 9. Said jaw 9 is held from turning by being provided with a pin 12 which plays in a slot 13 formed in the body 3. The cutting member 6 is shown as provided with a rib 14 which is gripped between the jaws 8 and 9 and preferably the rib will be a dove-tailed rib and the jaws will be under cut to fit the rib. The clamping faces of the jaws and the rib 14 extend transversely to the length of the shank and are inclined slightly to the axis so that when the cutting member is clamped between the jaws it occupies the inclined position shown in Fig. 1. Said cutting member has a uniform cross sectional shape from the top to the bottom thereof, that is, the edge 16 is V-shaped from one end to the other. The cutting edge, however, is the portion 7 at the top of the cutting member. When the tool is used for cutting threads, the cutting edge will gradually become dull and in order to grind the tool it is removed from the shank and the upper end of the tool is ground off but the sides 18 of the V-shaped edge 16 are not touched. If, for instance, the cutting edge becomes dull and the end of the cutting member is ground down to the dotted line 17 Fig. 1, it will be apparent that a very sharp cutting edge will be presented which will have the same V-shape as the former cutting edge. Since the two sides 18 of the edge 16 have the correct angular relation to each other for cutting the desired threads, it will be readily seen that the correct shape of the cutting edge will be maintained simply by grinding the end of the cutting member, so as to present cutting edges that are parallel with the edge 7 or the dotted lines 17. After the tool is ground it can be readily replaced between the clamping jaws and during the operation of removing the cutting member or replacing it, the position of the shank 3 does not need to be disturbed. It will thus be seen that when the tool is replaced in the machine after grinding no setting of the tool will be necessary.

In some kinds of work, it is desirable that the cutting edge should be situated farther above the axis of the shank than in doing other kinds of work, and this adjustment of the cutting edge can be easily effected by simply raising or lowering the cutting member and without re-adjusting in any way the shank.

Although I have herein shown a cutting member having a V-shaped cutting edge adapted for cutting screw-threads, yet it will be obvious that the cutting member might have a cutting edge of any other desired shape and one which is adapted for turning, planing, facing, boring, or performing any other similar operation.

Having fully described my invention, what I claim as new and desire to secure by Letters Patent is:—

In a tool, the combination with a shank having in one side thereof near one end a transversely-extending recess, one side of which forms an undercut clamping jaw, a cutting member provided with a dove-tailed rim which occupies said recess and engages said jaw, said shank having a bore extending from the recess longitudinally through the same to the opposite end, a clamping member slidably mounted on the bore, a set screw at the opposite end of the shank for engaging the clamping member and forcing it toward the clamping jaw, said shank having a slot which terminates at said opposite end, and a projection extending from the clamping member and entering said slot thereby to hold the clamping member from turning.

In testimony whereof, I have signed my name to this specification, in the presence of two subscribing witnesses.

JAMES CARR.

Witnesses:
 LOUIS C. SMITH,
 THOMAS J. DRUMMOND.

---

Copies of this patent may be obtained for five cents each, by addressing the "Commissioner of Patents, Washington, D. C."